United States Patent [19]

Teramachi

[11] Patent Number: 4,514,018
[45] Date of Patent: Apr. 30, 1985

[54] LINEAR SLIDE BEARING AND LINEAR SLIDE TABLE UNIT EMPLOYING THE SAME

[76] Inventor: Hiroshi Teramachi, 2-34-8, Higashi-Tamagawa, Setagaya-ku, Tokyo, Japan

[21] Appl. No.: 567,980
[22] Filed: Jan. 4, 1984

[30] Foreign Application Priority Data

Apr. 21, 1983 [JP] Japan .................................. 58-69237

[51] Int. Cl.³ ........................................... F16C 29/06
[52] U.S. Cl. ................................................. 308/6 C
[58] Field of Search ...................... 308/6 C, 6 R, 6 A; 464/168

[56] References Cited
U.S. PATENT DOCUMENTS

| | | | |
|---|---|---|---|
| 4,118,101 | 10/1978 | Teramachi | 308/6 C |
| 4,363,526 | 12/1982 | Teramachi | 464/168 |
| 4,427,240 | 1/1984 | Teramachi | 308/6 C |
| 4,428,627 | 1/1984 | Teramachi | 308/6 C |

Primary Examiner—Lenard A. Footland
Attorney, Agent, or Firm—Jordan and Hamburg

[57] ABSTRACT

A linear slide bearing comprises: a slide block constituted by a block body of U-shaped cross-section having on the inner surfaces of both arms thereof a pair of right and left obliquely upward and downward directed raceways extending longitudinally thereof, the block body further having non-load carrying ball bores longitudinally extending through solid portions of the arms; a track shaft fitted in a recess of the slide block so as to be slidable longitudinally thereof, the track shaft being formed on both its side portions facing the inner surfaces of both the arms with obliquely upward and downward directed raceways facing the raceways on the arms, respectively, to form load carrying ball grooves in cooperation with these raceways; a pair of side covers attached to both side surfaces of the slide block and having respective guide grooves for providing communication between the load carrying ball grooves and the associated non-load carrying ball bores, respectively; and a multiplicity of balls accommodated in two rows of endless tracks formed by the load carrying ball grooves, non-load carrying ball bores and guide grooves, the balls being adapted to recirculate through the insides of the endless tracks. Also disclosed is a linear slide table unit incorporating therein the above-mentioned linear slide bearing.

15 Claims, 35 Drawing Figures

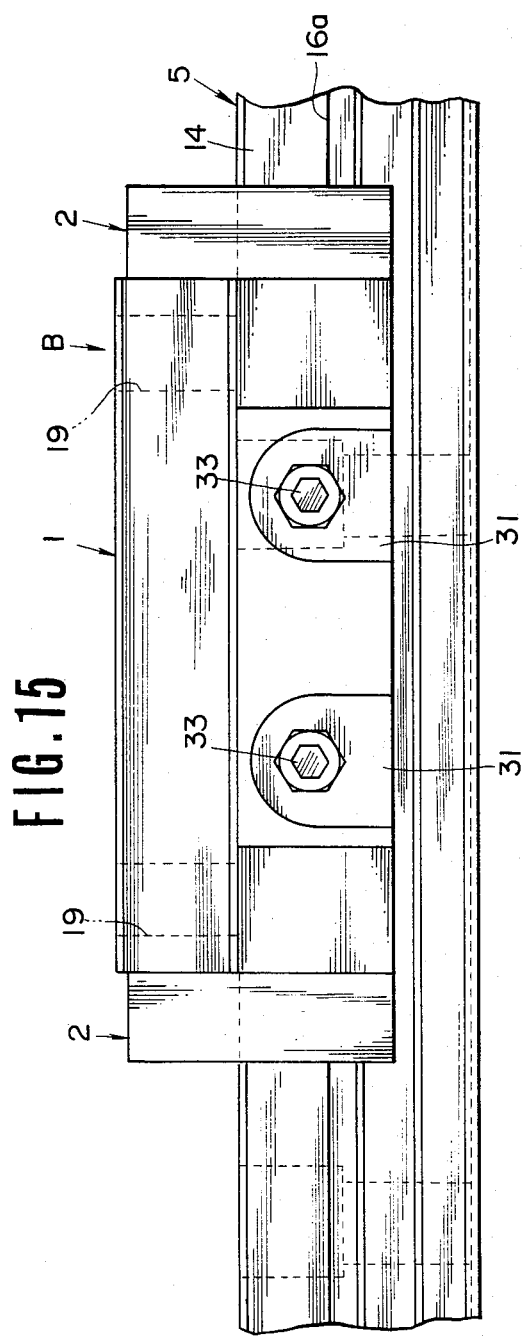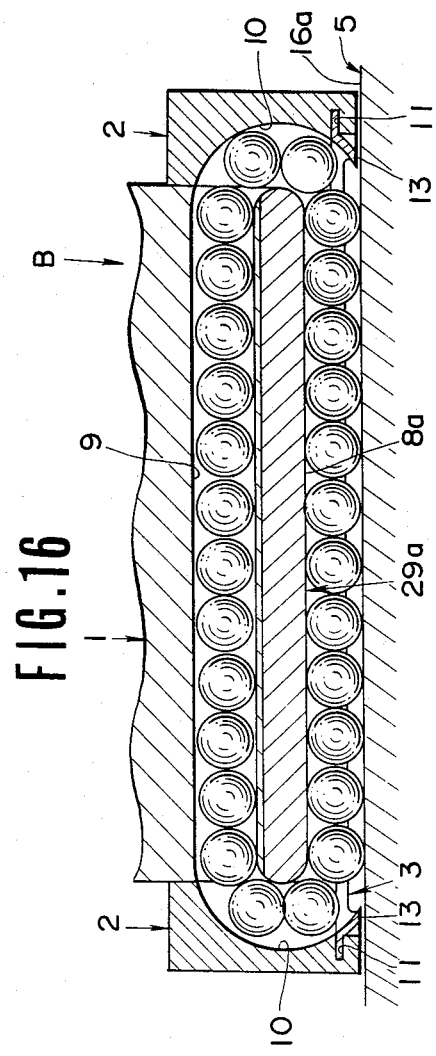

LINEAR SLIDE BEARING AND LINEAR SLIDE TABLE UNIT EMPLOYING THE SAME

BACKGROUND OF THE INVENTION

The present invention relates to a linear slide bearing and a linear slide table unit constructed by employing the same.

Hitherto, this kind of bearing and table unit which effect a linear guide are widely employed in the sliding part of various general industrial machines such as machining centers, X-, Y- and Z-axes of numerical controlled machine tools, automatic tool changers, automatic welding machines, injection molding machines and industrial robots.

These linear slide bearing and table unit employed in the sliding part of such industrial machines are required to be incorporated in the sliding part with a high accuracy and to be excellent in positioning and repetition accuracies as well as long in life. These properties are particularly important in a linear slide table unit which effects a linear reciprocative motion while bearing a large load. Moreover, the linear slide bearing must be able to readily offer the above-mentioned properties when incorporated in a table unit.

Further, a typical conventional linear slide bearing is arranged such that a pair of raceway grooves are formed in each of shoulders of each track shaft for rolling of load-carrying ball trains on the associated slide block along these raceway grooves, respectively, so that each shoulder of the track shaft is clamped by means of a pair of load-carrying ball trains, thereby to bear loads applied in all directions. Therefore, each track shaft requires machining for forming four grooves. Also, it is necessary to form four endless tracks for balls on the slide block. In consequence, a large number of processes are required for machining these track shaft and slide block, particularly for grinding and finishing the grooves thereof, resulting in an increase in production cost, disadvantageously.

Furthermore, in such a bearing as described above, if there is a clearance between raceways and balls which bear a load between the slide block and the track shaft, an excessively large impact load is momentarily applied to the bearing by means of a hammering action or a prying and twisting load due to an inertia moment at a direction change in the reciprocating motion, causing a reduction in life. In addition, the positioning and repetition accuracies are deteriorated in accordance with the amount of the clearance.

Accordingly, in the bearing of this kind, it is necessary to apply a preload to the bearing in order to make the above-mentioned clearance negative, thereby to increase the load bearing capacity as well as avoid a momentary application of a large impact load on the bearing for elongation of its life and, moreover, increase the rigidity of the bearing itself. The bearing is, therefore, required to be able to readily apply such a preload.

SUMMARY OF THE INVENTION

In view of the above, it is an object of the invention to provide an improved linear slide bearing which can be manufactured at a reduced cost simply by forming two raceway grooves for each slide block for bearing of loads in all directions, thereby to reduce by half the number of the raceways on both the slide block and the track shaft, which require a troublesome machining.

It is another object of the invention to provide an improved linear slide bearing in which the balls can be readily preloaded when the bearing is incorporated in a table unit, by making the loading directions opposite to each other on both sides of the slide block of the bearing.

It is still another object of the invention to provide an improved linear slide bearing in which the magnitude of the preload applied to the balls can be adjusted as required.

It is a further object of the invention to provide a linear slide table unit incorporating therein the above-mentioned linear slide bearing.

It is a still further object of the invention to provide an improved linear slide table unit incorporating therein the above-mentioned linear slide bearing in which the bearing can be preloaded in an extremely simple manner to eliminate any clearance between the raceways and the balls which bear a load between the slide block and the track shaft for improving durability and increasing positioning and repetition accuracies, and in which the clearance can be negative for increasing the load bearing capacity so that positioning and repetition accuracies will never be deteriorated even when a large load is applied.

To these ends, according to a first aspect of the invention, there is provided a linear slide bearing comprising: a slide block constituted by a block body of U-shaped cross-section having on the inner surfaces of both arms thereof a pair of right and left obliquely upward and downward directed raceways extending longitudinally thereof, the block body further having non-load carrying ball bores longitudinally extending through solid portions of the arms; a track shaft fitted in a recess of the slide block so as to be slidable longitudinally thereof, the track shaft being formed on both its side portions facing the inner surfaces of both the arms with obliquely upward and downward directed raceways facing the raceways on the arms, respectively, to form load carrying ball grooves in cooperation with these raceways; a pair of side covers attached to both side surfaces of the slide block and having respective guide grooves for providing communication between the load carrying ball grooves and the associated non-load carrying ball bores, respectively; and a multiplicity of balls accommodated in two rows of endless tracks formed by the load carrying ball grooves, non-load carrying ball bores and guide grooves, the balls being adapted to recirculate through the insides of the endless tracks.

According to a second aspect of the invention, there is provided a linear slide table unit comprising: a bed having a pair of mounting reference surfaces; and a mounting table slidably supported on the bed through a pair of bearings, wherein each of the bearings includes: a slide block secured at its upper surface to the mounting table and constituted by a block body of U-shaped cross-section having on the inner surfaces of both arms thereof a pair of right and left obliquely upward and downward directed raceways extending longitudinally thereof, the block body further having non-load carrying ball bores longitudinally extending through solid portions of the arms; a track shaft secured to one of the mounting reference surfaces of the bed and fitted in a recess of the slide block so as to be slidable longitudinally thereof, the track shaft being formed on both its side portions facing the inner surfaces of both the arms with obliquely upward and downward directed raceways facing the raceways on the arms, respectively, to form load carrying ball grooves in cooperation with these raceways; a pair of side covers attached to both side surfaces of the slide block and having respective guide grooves for providing communication between the load carrying ball grooves and the associated non-load carrying ball bores, respectively; and a multiplicity of balls accommodated in two rows of endless tracks formed by the load carrying ball grooves, non-load carrying ball bores and guide grooves, the balls being adapted to recirculate through the insides of the endless tracks.

The above and other objects, features and advantages of the invention will become clear from the following description of the preferred embodiments thereof taken in conjunction with the accompanying drawings.

BRIEF DESCRIPIOTN OF THE DRAWINGS

FIG. 15 is a front elevational view of the linear slide bearing shown in FIG. 13;

FIG. 16 is a sectional view taken along the line XVI—XVI of FIG. 14;

DESCRIPTION OF THE PREFERRED EMBODIMENTS

Figure 1:
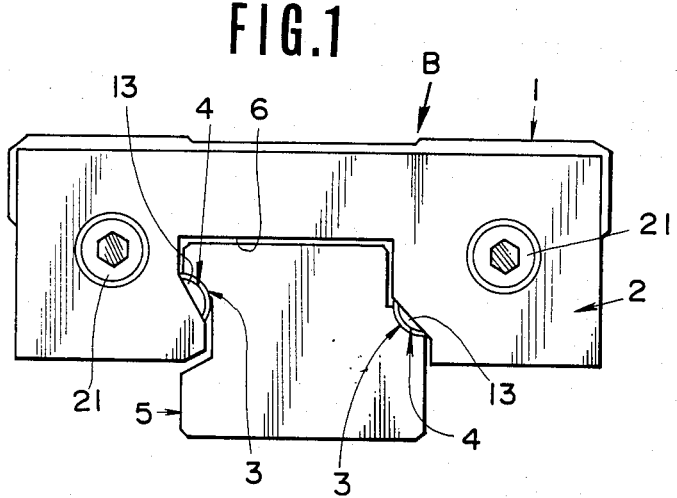
FIG. 1 is a side elevational view of a linear slide bearing in accordance with a first embodiment of the invention.

A linear slide bearing and a linear slide table unit in accordance with the invention will be described hereinunder in detail through embodiments with reference to the accompanying drawings.

FIGS. 1 to 7 in combination show a linear slide bearing B in accordance with a first embodiment of the invention. The bearing B is composed of: a slide block 1 constituted by a block body of substantially C-shaped cross-section and having a recess 6 formed on its underside; a pair of side covers 2 attached to right and left side surfaces of the slide block 1, respectively; a pair of ball retainers 3 mounted between these side covers 2; a multiplicity of balls recirculating through endless tracks formed in the slide block 1; and a track shaft 5 formed to have a substantially square cross-section and adapted to bear a load applied from the slide block 1 through the balls 4.

Figure 2:
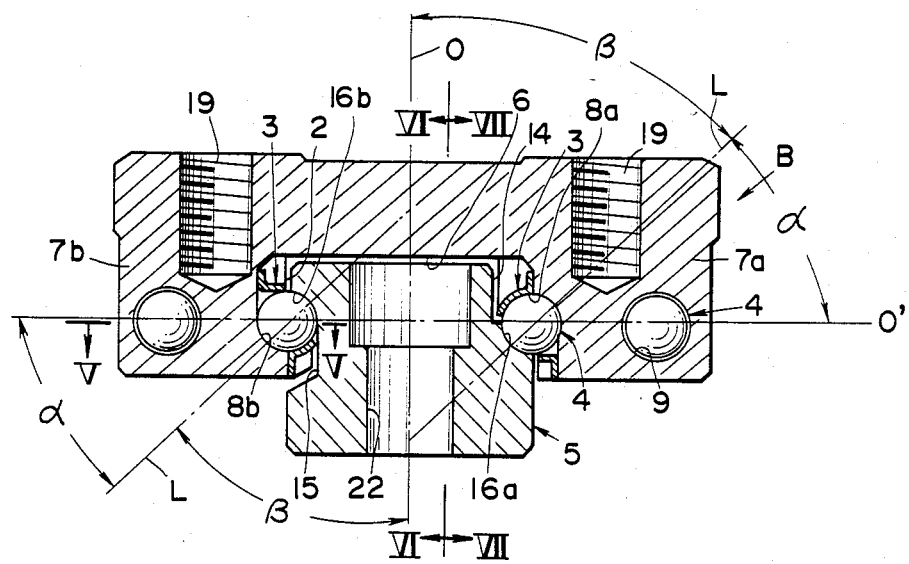
FIG. 2 is a transverse sectional view of the linear slide bearing shown in FIG. 1.
Figure 3:
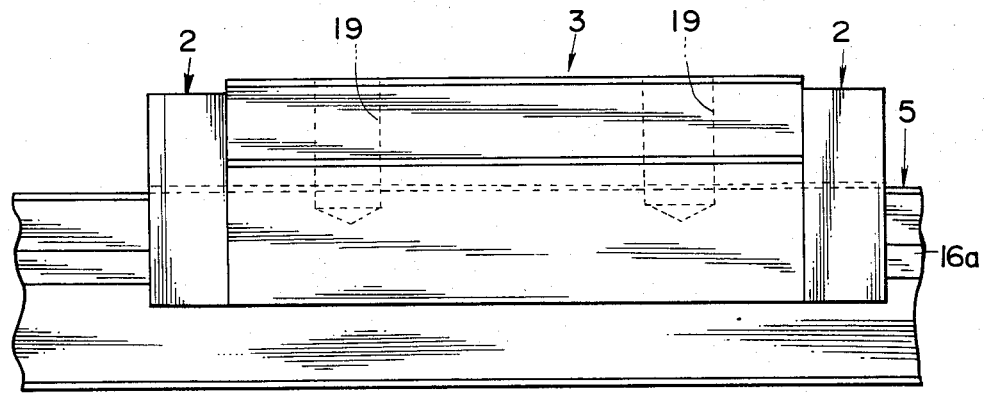
FIG. 3 is a front elevational view of the linear slide bearing shown in FIG. 1.
Figure 4:
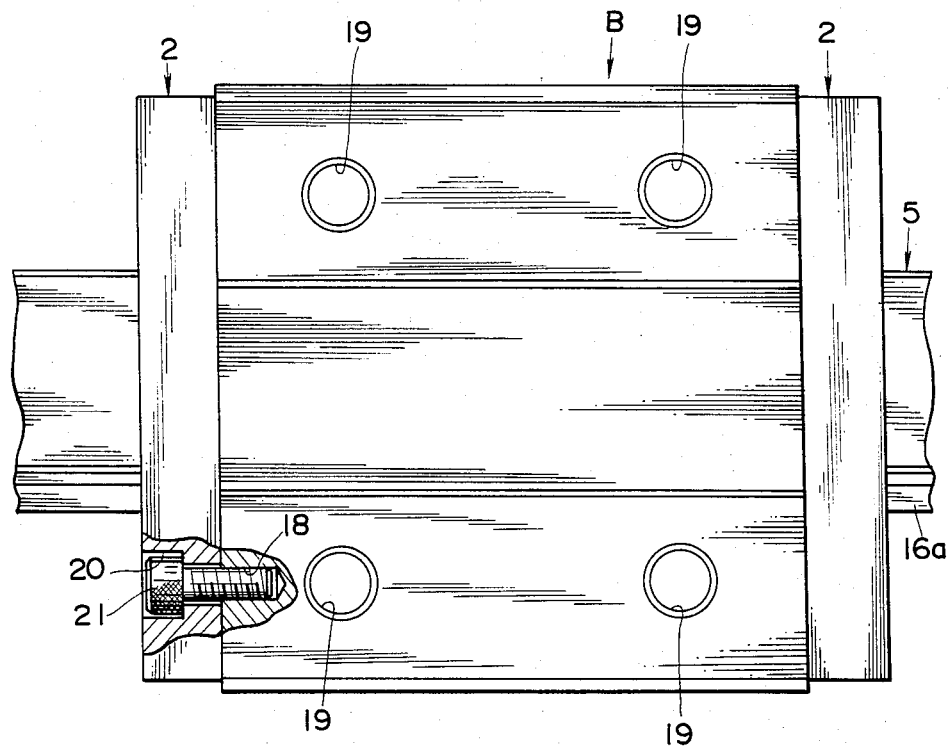
FIG. 4 is a plan view of the linear slide bearing shown in FIG. 1.
Figure 5:
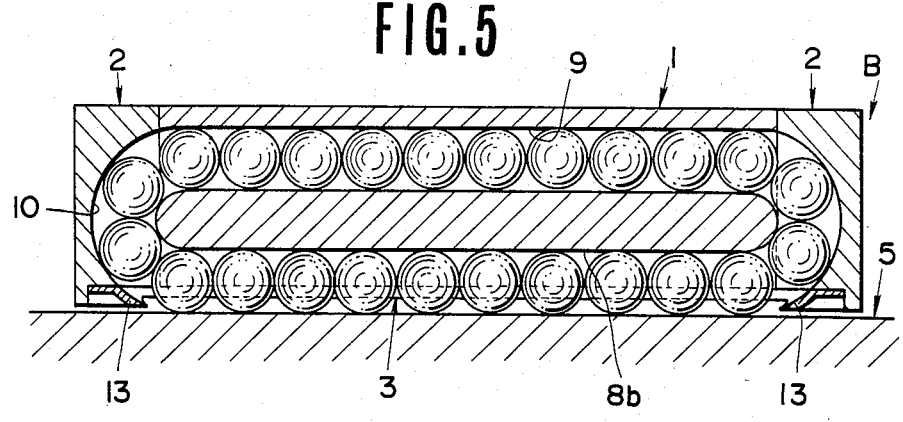
FIG. 5 is a sectional view taken along the line V—V of FIG. 2.
Figure 6:
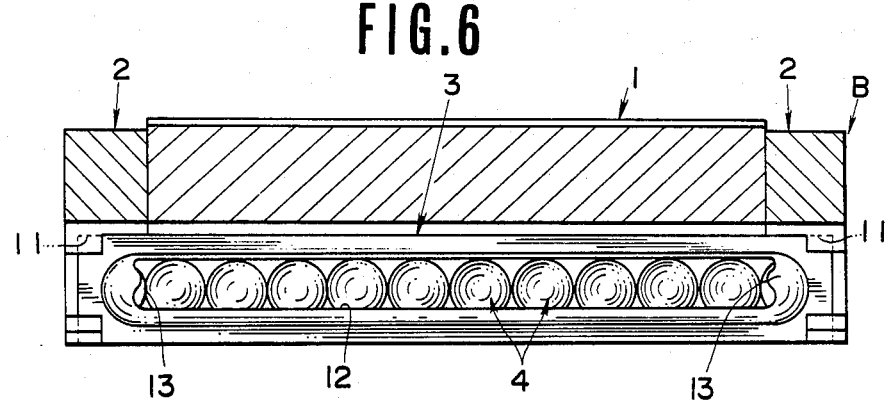
FIG. 6 is a sectional view taken along the line VI—VI of FIG. 2, showing the linear slide bearing with its track shaft removed.
Figure 7:
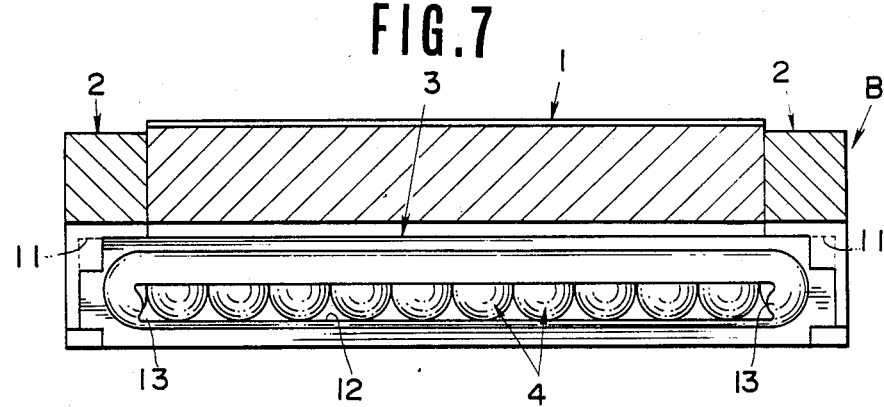
FIG. 7 is a sectional view taken along the line VII—VII of FIG. 2, showing the linear slide bearing with its track shaft removed.
Figure 8:
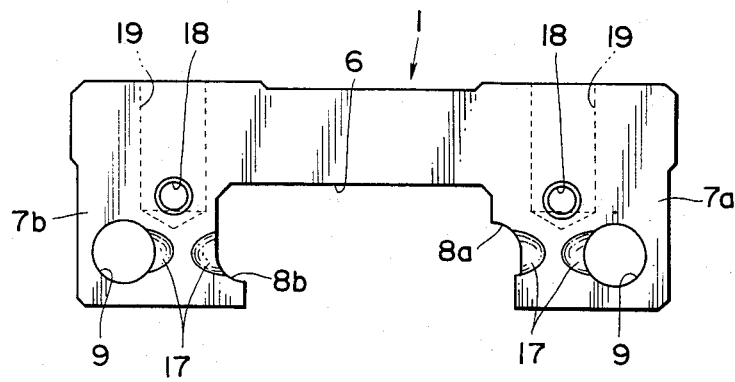
FIG. 8 is a side elevational view of a slide block.
Figure 9:
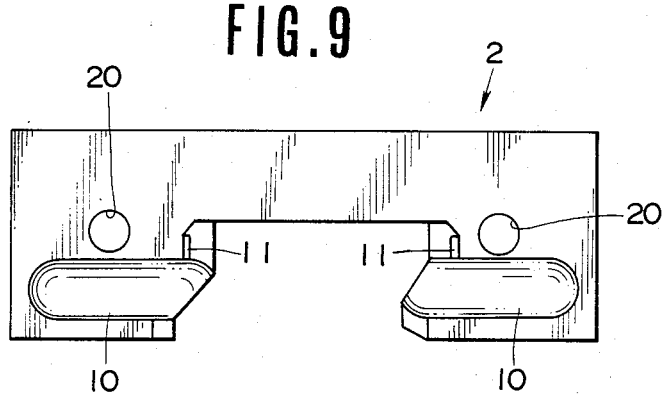
FIG. 9 is a rear elevational view of a side cover.

The slide block 1 has, as shown in FIGS. 2, 4 and 8, raceways 8a, 8b of substantially arcuate cross-section which are formed on the inner surfaces of both arms 7a, 7b of the slide block 1 in the longitudinal direction thereof and directed obliquely downward and upward, respectively. Moreover, non-load carrying ball bores 9 are formed in the arms 7a, 7b longitudinally thereof, respectively. It is to be noted that a reference numeral 17 in FIGS. 8, 18 and 21 to 24 denotes each of cut portions, for turning the balls 4, formed between the raceways 8a, 8b and the non-load carrying ball bores 9, respectively, and a numeral 18 in FIGS. 4, 8, 17 and 18 represents each of holes for mounting the side covers 2, respectively. In addition, a numeral 19 denotes each of holes for installing a mounting table 27, described later. Moreover, in this embodiment, one raceway 8a directed obliquely downward has its lower portion slightly projected inwardly, as shown in FIGS. 2 and 8, thereby to eliminate the possibility that the slide block 1 may rotate to come off when installed on the track shaft 5.

On the other hand, each of the side covers 2 is, as shown in FIGS. 5 to 7 and 9, formed by means of an injection molding of a hard synthetic resin, and has circumferential guide grooves 10 formed in both side portions thereof for guiding the balls 4 between the raceways 8a, 8b and non-load carrying bores 9 in the slide block 1. Moreover, each side cover 2 has fitting grooves 11 for mounting the ball retainers 3 by fitting end portions of the ball retainers 3 thereinto. It is to be noted that in the drawings a reference numeral 20 denotes each of bores for receiving bolts 21, respectively, for mounting the side cover 2 to the slide block 1.

The ball retainers 3 mounted between the side covers 2 are formed by means of pressing or the like of a metal sheet and are disposed along the raceways 8a, 8b formed on the arms 7a, 7b of the slide block 1, respectively. Moreover, slits 12, from which the balls 4 rolling along the raceways 8a, 8b partially project, are opened in the ball retainers 3 at the positions corresponding to the raceways 8a, 8b, respectively, thereby to form load carrying ball grooves for the balls 4. In addition, at both end portions of the slits 12 formed in the ball retainers 3, respectively, ball guides 13 are formed which project toward their corresponding raceways 8a, 8b so as to scoop the balls 4 rolling along the raceways 8a, 8b into the guide grooves 10 in the side covers 2 as well as send the balls 4 rolling through the non-load carrying ball bores 9 into the raceways 8a, 8b from the guide grooves 10, respectively.

Figure 10:
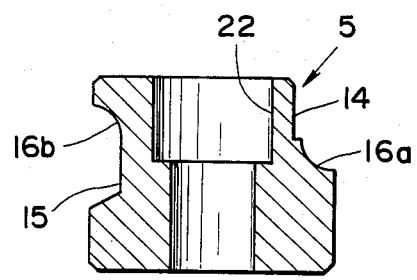
FIG. 10 is a sectional view of the track shaft.
Figure 11:
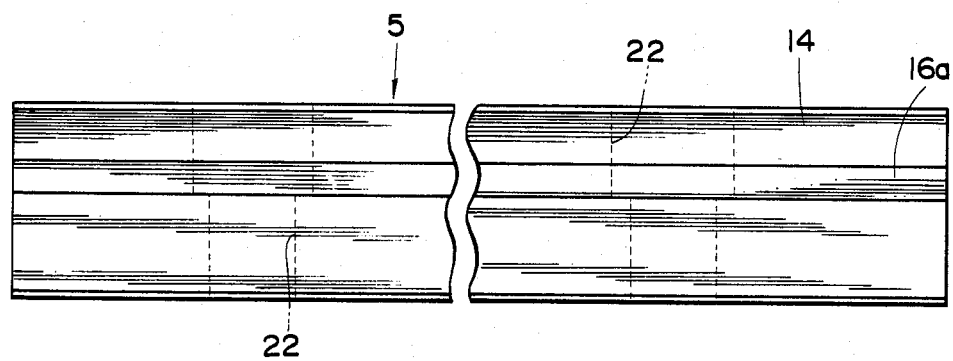
FIG. 11 is a front elevational view of the track shaft.

Moreover, the track shaft 5 has, as shown in FIGS. 2, 10 and 11, a cut portion 14 formed in the shoulder on one side thereof as well as a recess 15 formed in the side wall on the other side. In the lower end corner of the cut portion 14 and the upper end corner of the recess 15, substantially arcuate raceways 16a, 16b are formed extending longitudinally thereof, respectively, while being directed toward the directions substantially opposite to each other. In addition, these raceways 16a, 16b are directed obliquely upward and downward so as to face the raceways 8a, 8b formed on the arms 7a, 7b of the slide block 1, respectively. Thus, two load carrying ball grooves are formed by these opposing raceways 8a, 16a and 8b, 16b, respectively.

The arrangement is, therefore, such that a pair of endless tracks are constituted by: the load carrying grooves formed by the raceways 8a, 16a and 8b, 16b; the non-load carrying ball bores 9, 9 formed in the arms 7a, 7b; and the guide grooves 10, 10 formed in the side covers 2, respectively, and the balls 4 recirculate while rolling through these tracks.

In the illustrated embodiment, the balls 4 rolling through the load carrying ball grooves defined between the raceways 8a, 8b formed on the arms 7a, 7b and the raceways 16a, 16b formed on the track shaft 5 have the contact angle $\alpha$ with respect to the raceways 8a, 8b which is set to be about 45 degrees. The term "contact angle $\alpha$" in this case is employed to mean the angle made by the direction of load of the rolling element acting on the contact area between the balls 4 and the raceways 8a, 8b, i.e., the angle included between a line L of application of the load and a plane O' perpendicular to the center line O of the bearing B. Thus, selecting the contact angle $\alpha$ to be 45 degrees makes it possible to equalize the angles $\beta$ and $\alpha$, the angle $\beta$ being made by the line L of application of the load on the balls 4 and the line of application of a vertical load applied on the slide block 1, i.e., the center line O of the bearing B, the angle $\alpha$ being made by the line L and the line of application of a horizontal load on the slide block 1, i.e., a plane O'. In consequence, it is possible to equally bear the loads applied on the slide block 1 in the vertical and horizontal directions, respectively.

It is to be noted that a reference numeral 22 represents a bore for securing the track shaft 5 onto a mounting reference surface of a machine as described later.

Figure 12:
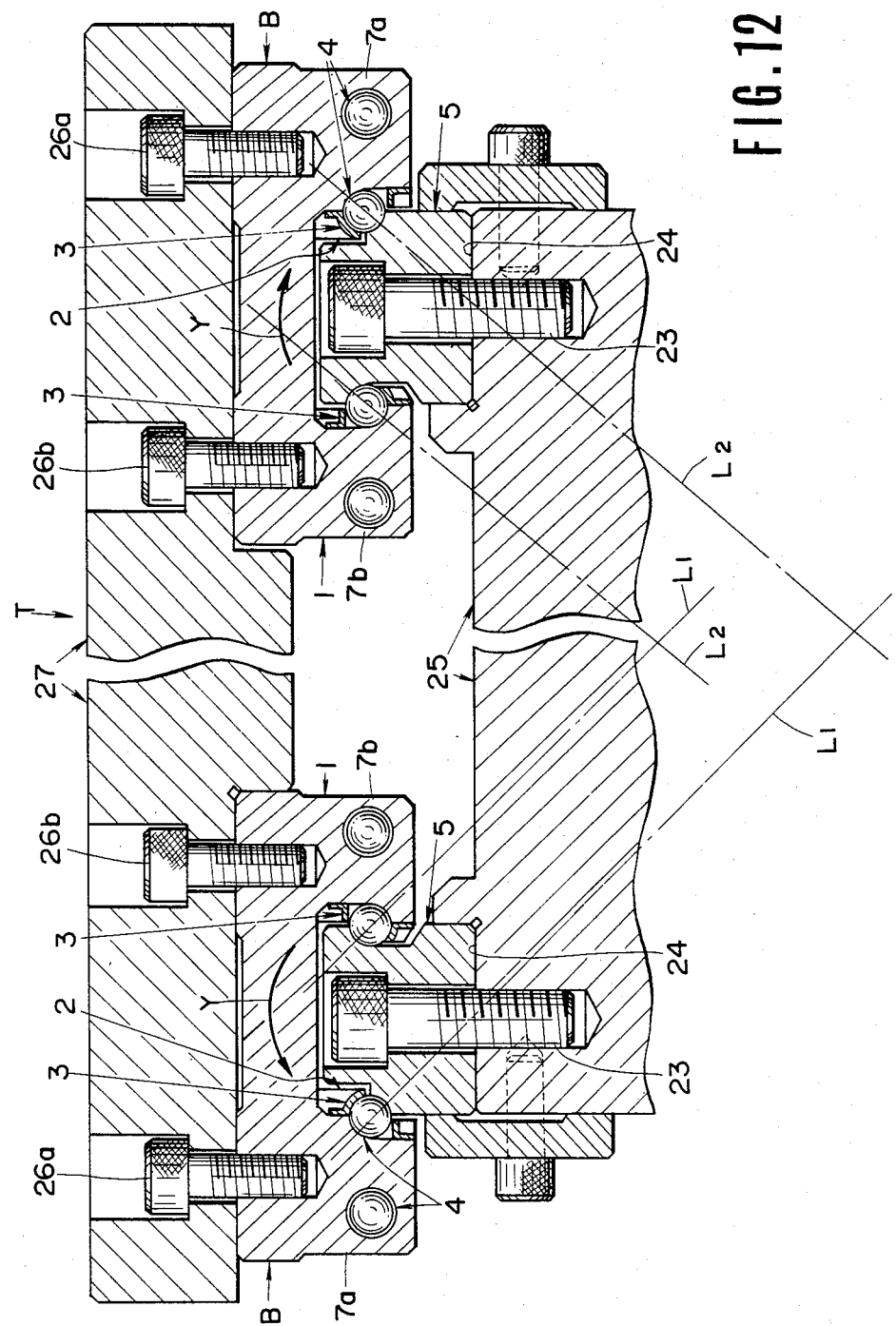
FIG. 12 is a sectional view of a linear slide table unit constructed by incorporating therein the bearing in accordance with the first embodiment; .
Figure 13:
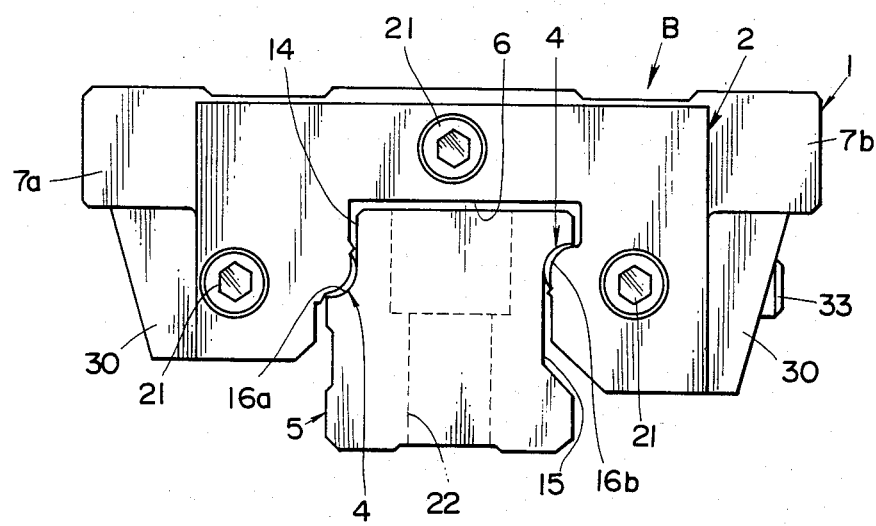
FIG. 13 is a side elevational view of a linear slide bearing in accordance with a second embodiment of the invention.
Figure 14:
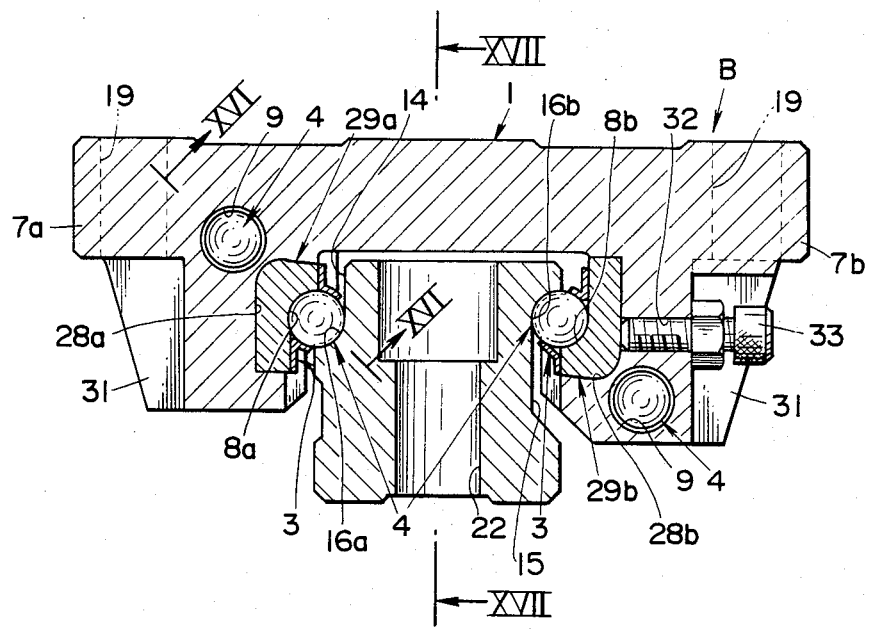
FIG. 14 is a transverse sectional view of the linear slide bearing shown in FIG. 13.
Figure 17:
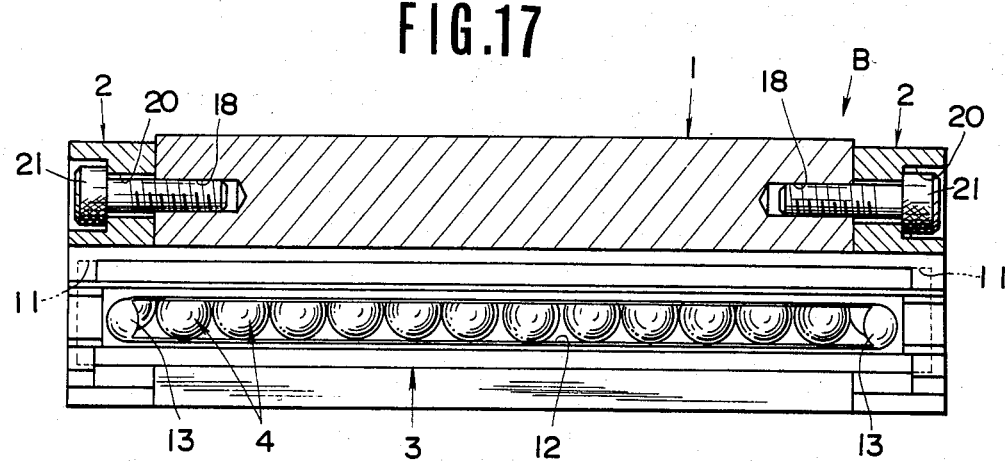
FIG. 17 is a sectional view taken along the line XVII—XVII of FIG. 14, showing the linear slide bearing with its track shaft removed.

FIG. 12 shows a linear slide table unit T constructed by incorporating therein the linear slide bearing B in accordance with the above-described first embodiment. The linear slide table unit T is composed of: a pair of bearings B; a bed 25 having mounting reference surfaces 24 on which the track shafts 5 of these bearings B are mounted by means of mounting bolts 23, respectively; and a mounting table 27 installed on the upper surfaces of the slide blocks 1 of the bearings B by means of connecting bolts 26a, 26b which are used aligned in pair in the widthwise direction of each slide block 1.

In this table unit, the track shafts 5 of the bearings B are secured onto the respective mounting reference surfaces 24 of the bed 25 in a manner such that the raceways 16a, which are formed at the lower ends of the cut portions 14 in one of the shoulders thereof and directed upwardly, are disposed on the outer side, that is, the lines $L_1$, $L_2$ of application of loads on the left and right bearings B, B intersect each other below the bearings B, B as viewed in FIG. 12. The height of the mounting position of the mounting table 27 installed on the slide blocks 1 is adjusted on the side of the arms 7a having the raceways 8a facing the raceways 16a, respectively. The operation for adjusting the height of the mounting table 27 is effected by interposing a plurality of thin shims (not shown) between the upper surfaces of the arms 7a, 7b of each slide block 1 and the undersurface of the mounting table 27. Upon completion of the adjustment of the height of the mounting table 27 by such an operation, the mounting table 27 is removed, and a proper number of the shims placed on the arms 7b are removed. Then, the mounting table 27 is installed again by means of the connecting bolts 26a, 26b, which are then tightened to lift the slide blocks 1 at the side of the arms 7b by a distance corresponding to the total thickness of the removed shims, thereby to twist each slide block 1 in the direction of the corresponding arrow Y for applying a desired preload to each bearing B.

Moreover, as mentioned above, the track shafts 5 of the bearings B are disposed so that the lines $L_1$, $L_2$ of application of loads on the left and right bearings B, B intersect each other below the bearings B, B. Therefore, even when the slide blocks 1 are subjected to large turning moments around the longitudinal axes of the track shafts 5, it is possible to reliably prevent the rotation of the slide blocks 1 with respect to the associated track shafts 5.

Figure 18:
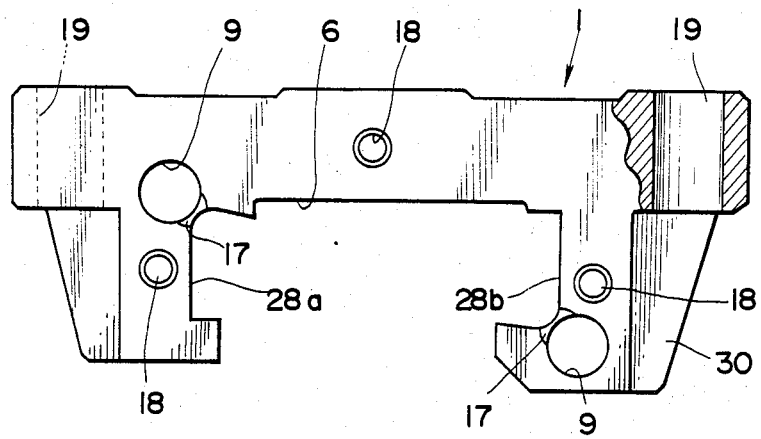
FIG. 18 is a partly-sectioned side elevational view of a slide block employed in the linear slide bearing in accordance with the second embodiment.
Figure 19:
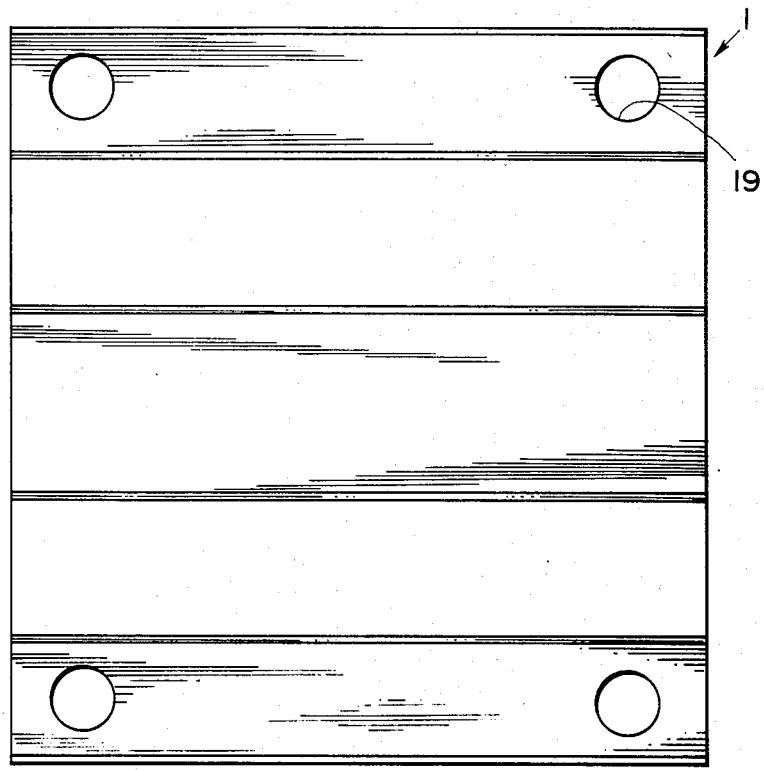
FIG. 19 is a plan view of the slide block shown in FIG. 18.
Figure 20:
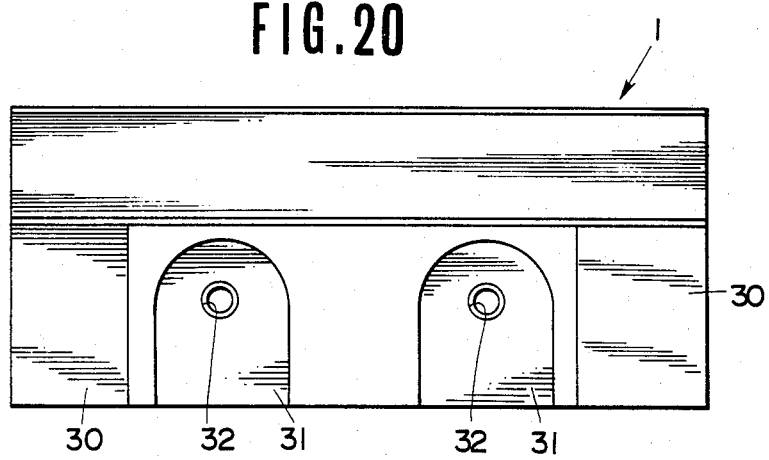
FIG. 20 is a front elevational view of the slide block shown in FIG. 18.
Figure 21:
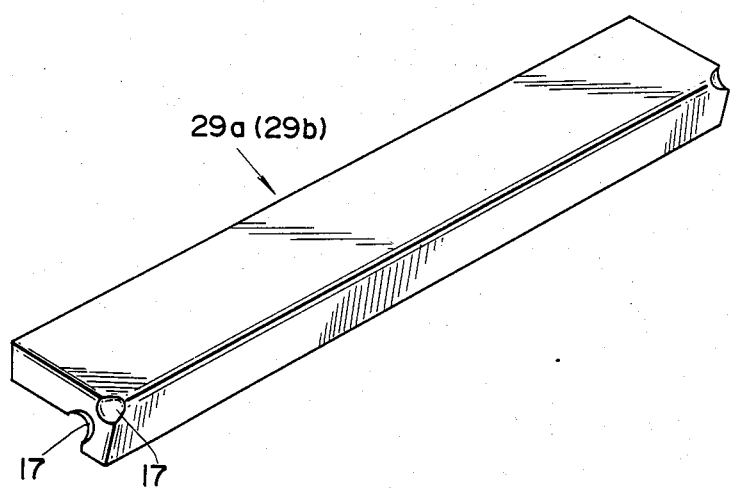
FIG. 21 is a perspective view of a bearing race.
Figure 22:
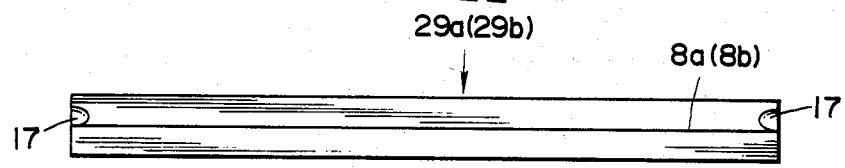
FIG. 22 is a side elevational view of the bearing race shown in FIG. 21 as viewed from the left thereof.
Figure 23:
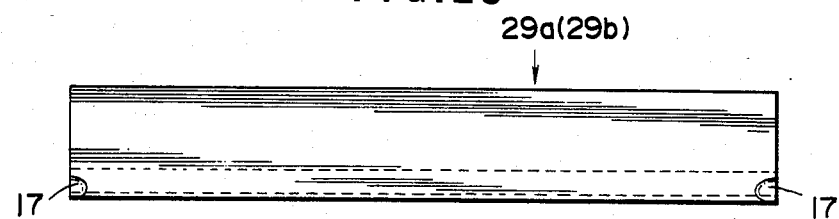
FIG. 23 is a plan view of the bearing race shown in FIG. 21.
Figure 24:
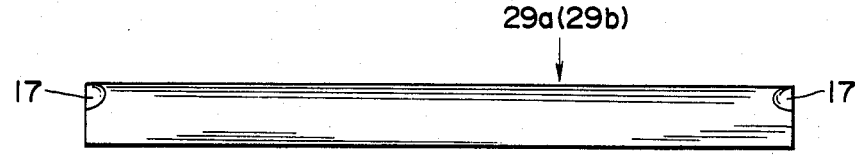
FIG. 24 is a side elevational view of the bearing race shown in FIG. 21 as viewed from the right thereof.
Figure 25:
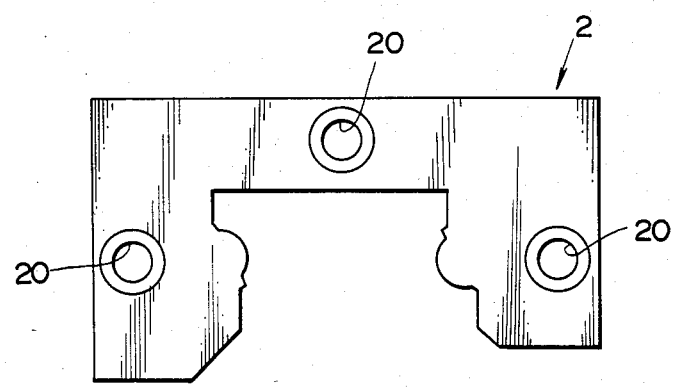
FIG. 25 is a front elevational view of a side cover employed in the linear slide bearing in accordance with the second embodiment.
Figure 26:
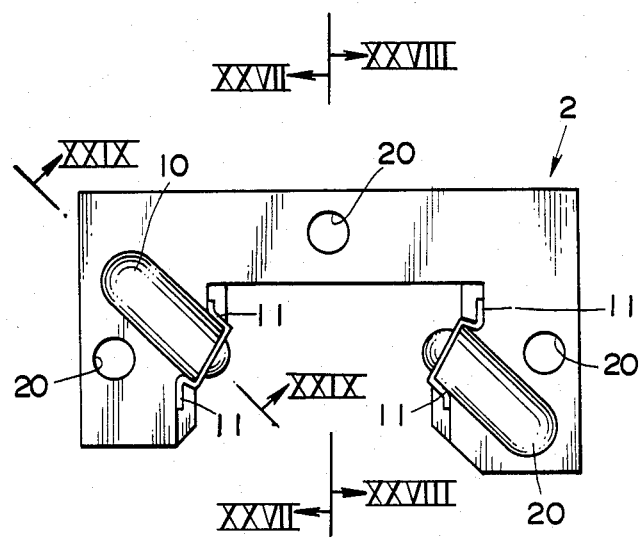
FIG. 26 is a rear elevational view of the side cover shown in FIG. 25.
Figure 27:
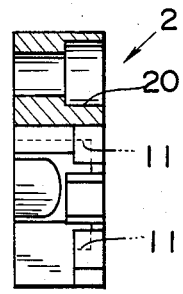
FIG. 27 is a sectional view taken along the line XXVII—XXVII of FIG. 26.
Figure 28:
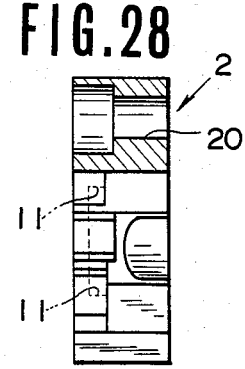
FIG. 28 is a sectional view taken along the line XXVIII—XXVIII of FIG. 26.
Figure 29:
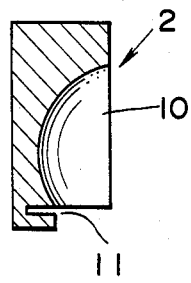
FIG. 29 is a sectional view taken along the line XXIX—XXIX of FIG. 26.
Figure 30:
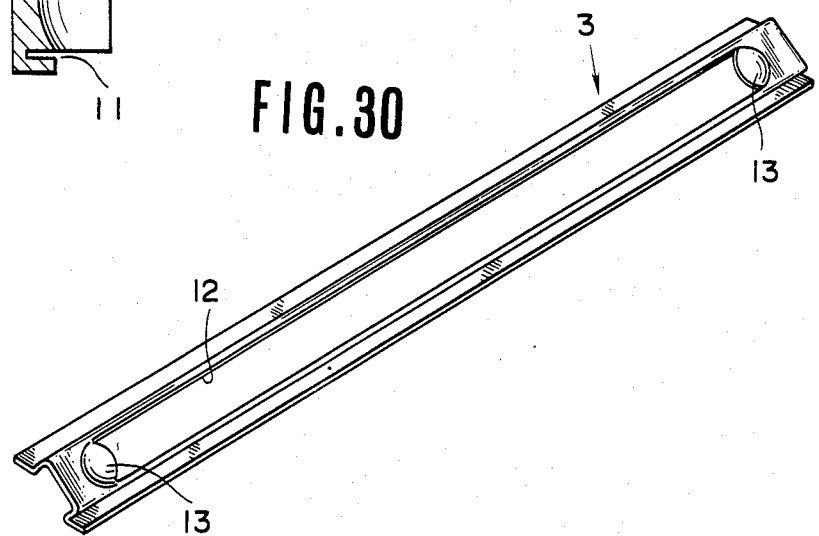
FIG. 30 is a perspective view of a ball retainer.
Figure 31:
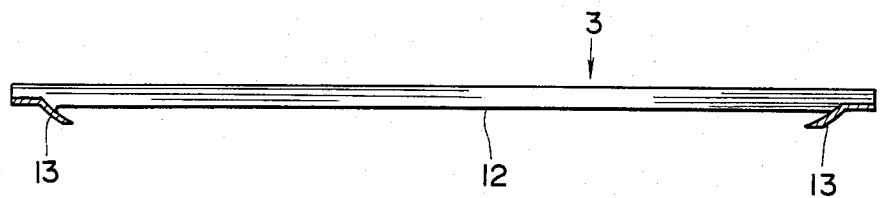
FIG. 31 is a longitudinal sectional view taken along the center of the ball retainer shown in FIG. 30.
Figure 32:
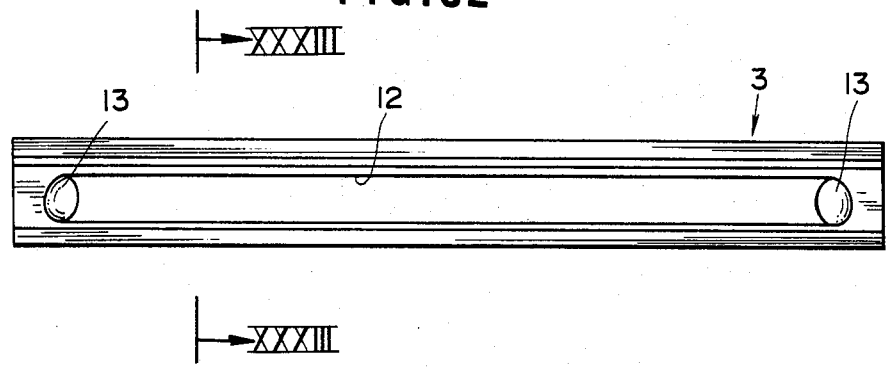
FIG. 32 is a rear elevational view of the ball retainer shown in FIG. 30.
Figure 33:
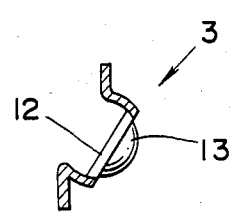
FIG. 33 is a sectional view taken along the line XXXIII—XXXIII of FIG. 32.
Figure 34:
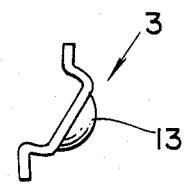
FIG. 34 is an end view of the ball retainer shown in FIG. 30.

FIGS. 13 to 34 in combination show a linear slide bearing B in accordance with a second embodiment of the invention. The slide block 1 of this bearing B has, as shown in FIGS. 14, 15 and 18 to 20, fitting grooves 28a, 28b formed in the inner sides of both arms 7a, 7b thereof, respectively. Fitted in the fitting grooves 28a, 28b are bearing races 29a, 29b which are designed to have a substantially L-shaped cross-section and provided with raceways 8a, 8b formed in the corners thereof. As shown in FIGS. 15, 18 and 20, each of the arms 7a, 7b of the slide block 1 has recesses 30, formed in the lower parts thereof at both longitudinal end portions, for forming through-hole-like mounting bores 19. In addition, recesses 31 are also formed at lower positions in the longitudinal intermediate portion of each of the arms 7a, 7b. In the recesses 31 on the arm 7b, tapped holes 32 are formed through the arm 7b.

The bearing races 29a, 29b fitted in the corresponding fitting grooves 28a, 28b of the slide block 1 are formed of a material having rigidity. The bearing races 29a, 29b have, as shown in FIGS. 14 and 21 to 24, cut portions 17 formed in the corners at both ends thereof so that the balls 4 can pass around between the raceways 8a, 8b and the corresponding non-load carrying ball bores 9.

Moreover, each of the side covers 2 attached to both side surfaces of the slide block 1 has, as shown in FIGS. 16, 17 and 25 to 29, an obliquely inclined circumferential guide groove 10 and fitting grooves 11 into which both end portions of each ball retainer 3 are fitted. Further, each of the ball retainers 3 is mounted between the side covers 2 so as to form load carrying ball grooves in cooperation with the raceways 8a, 8b of the bearing races 29a, 29b and has a slit 12 and ball guides 13 similar to those in the first embodiment as shown in FIGS. 30 to 34.

Furthermore, the slide block 1 has preload-regulating bolts 33, each of whose ends abuts on the rear surface of the bearing race 29b to press the latter and which are screwed into the tapped holes 32, respectively, which laterally penetrate one arm 7b of the slide block 1 and are longitudinally separate from each other. These preload-regulating bolts 33 are adapted to press the portion of the bearing race 29b, which is lower than the horizontal line passing through the center of each of the balls 4 rolling along the raceway 8b of the bearing race 29b, thereby making it possible to apply to the bearing B a preload corresponding to the pressing force of each preload-regulating bolt 33.

Figure 35:
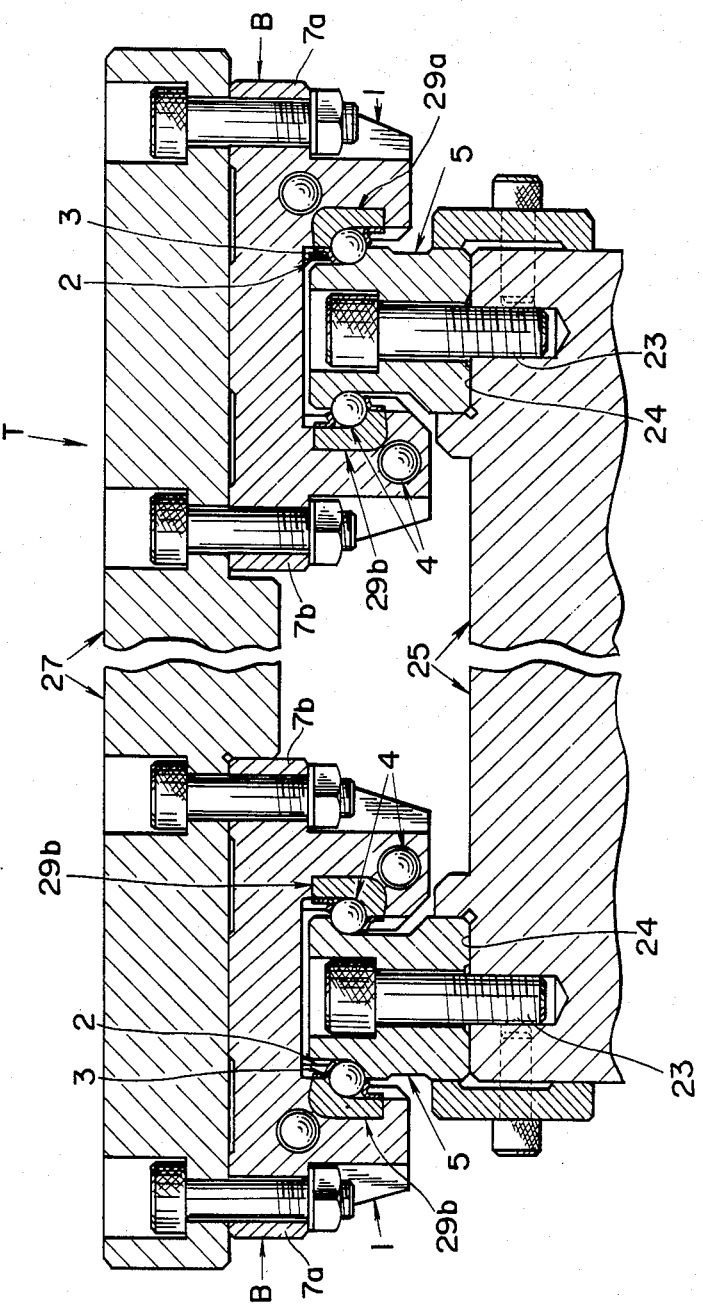
FIG. 35 is a sectional view of a linear slide table unit constructed by incorporating therein the bearing in accordance with the second embodiment.

FIG. 35 shows a linear slide table unit T constructed by incorporating therein the bearing B in accordance with the second embodiment. Similarly to the linear slide table unit T in accordance with the first embodiment, this linear slide table unit T is composed of: a pair of bearings B; a bed 25 having a pair of mounting reference surfaces 24 on which the track shafts 5 of these bearings B are secured; and a mounting table 27 installed on the upper surfaces of the slide blocks 1 of the bearings B. The arrangement is such that after the table unit T is assembled, the preload-regulating bolts 33 of the bearings B are tightened to apply a predetermined preload to the bearings B.

It is to be noted that in the embodiments of the linear slide table units T shown in FIGS. 12 and 35, respectively, the mounting direction of each bearing B is not especially limitative thereto and the bearings B can be incorporated in the table units T so as to be inverted in the horizontal direction as viewed in FIGS. 12 and 35.

The invention having the construction described above has the following advantages:

In the linear slide bearing in accordance with the invention, the slide block has a pair of right and left obliquely upward and downward directed raceways which are formed on the inner sides of both arms of the slide block so as to extend longitudinally thereof, and the obliquely upward and downward directed raceways facing the raceways on the arms of the slide block are formed on both sides of the track shaft fitted in the recess in the slide block slidably in the longitudinal direction thereof, and then, a multiplicity of balls are interposed in a pair of load carrying ball grooves defined by the raceways obliquely facing each other, respectively. Therefore, it is possible to allow the track shaft to bear loads applied on the slide block in the vertical and horizontal directions through only the pair of load carrying ball grooves. Moreover, since it is only required to form two rows of raceways for each of the slide block and the track shaft, the number of processes of grooving the raceways, which are inconveniently necessary to machine with a high accuracy, is halved to permit the bearing to be manufactured at a reduced cost. In addition, when the bearing is incorporated in a linear slide table unit, a desired preload can be readily applied to the bearing.

Further, although the contact angle between each of the raceways and the balls can be selected to be other than 45 degrees to attain the objects of the invention, if the contact angle is selected to be 45 degrees, loads applied in the vertical and horizontal directions can be uniformly borne, so that the bearing can be employed for a wide variety of uses.

On the other hand, the linear slide table unit in accordance with the invention incorporating therein the above-described bearing can be lowered in production cost by the use of the bearing, which is lower in cost than the conventional bearing. Moreover, a desired preload can be readily applied to each bearing by applying a twist to the mounting table by the preload-regulating means. Therefore, in each bearing, the clearances between the balls and the raceways on both the slide block and the track shaft are made negative to elastically deform the balls so that the balls are brought into contact with the raceways with a wide contact area, thereby increasing the contact rate of the balls as a whole to make it possible to improve the bearing in load bearing capacity and life as well as rigidity. Accordingly, it is possible to provide a linear slide table unit, which is high in durability as a whole and excellent in positioning and repetition accuracies.

Further, in the linear slide table unit of the invention, the mounting table is supported on the bed through the above-mentioned pair of bearings. Therefore, it is possible to effectively bear not only loads applied to the mounting table in the vertical and horizontal directions but also a moment load. Accordingly, the table unit of the invention can be employed greatly effectively in such a case that the loading direction changes or a moment load is applied; therefore, the invention can be applied to a variety of industrial uses.

In addition, the provision of the ball retainer along each of the raceways formed on the slide block of each bearing eliminates the possibility that the balls recirculating through the endless tracks formed at both arms of the slide block may come off these endless tracks. Accordingly, it becomes extremely easy to conduct various operations, such as the operation for incorporating the balls into the slide block; the operation for installing the slide block on the track shaft; and the operation for constructing the table unit by incorporating the bearings therein.

Although the invention has been described through specific terms, it is to be noted here that the described embodiments are not exclusive and various changes and modifications may be imparted thereto without departing from the scope of the invention which is limited solely by the appended claims.

What is claimed is:
1. A linear slide bearing comprising:
 a slide block constituted by a block body of U-shaped cross-section having on the inner surfaces of both arms thereof a pair of right and left obliquely upward and downward directed raceways extending longitudinally thereof, said block body further having non-load carrying ball bores longitudinally extending through solid portions of said arms;
 a track shaft fitted in a recess of said slide block so as to be slidable longitudinally thereof, said track shaft being formed on both its side portions facing the inner surfaces of both the arms with obliquely upward and downward directed raceways facing the raceways on said arms, respectively, to form load carrying ball grooves in cooperation with these raceways;

a pair of side covers attached to both side surfaces of said slide block and having respective guide grooves for providing communication between said load carrying ball grooves and the associated non-load carrying ball bores, respectively; and a multiplicity of balls accommodated in two rows of endless tracks formed by said load carrying ball grooves, non-load carrying ball bores and guide grooves, said balls being adapted to recirculate through the insides of said endless tracks.

2. A linear slide bearing according to claim 1, wherein said slide block has fitting grooves formed in the inner sides of both its arms, respectively, and bearing races of substantially L-shaped cross-section fitted in said fitting grooves, respectively, each of said bearing races having a raceway formed in the corner portion thereof.

3. A linear slide bearing according to claim 2, wherein at least one of the arms of said slide block is provided with a preload regulating bolt penetrating therethrough, said preload regulating bolt being adapted to press at its end the rear surface of said bearing race.

4. A linear slide bearing according to claim 3, herein the end of said preload regulating bolt abuts on the rear surface of the associated bearing race at a position lower than the horizontal line passing through the center of each of said load carrying balls rolling along the raceway of said bearing race.

5. A linear slide bearing according to claim 1, further comprising a pair of ball retainers mounted between said side covers along the corresponding raceways formed on said slide block for retaining the balls rolling along said raceways, respectively.

6. A linear slide bearing according to claim 1, wherein the contact angle of the balls, rolling along and between the raceways formed on both the arms of said slide block and the raceways formed on said track shaft, with respect to these raceways is set to be about 45 degrees.

7. A linear slide table unit comprising:
a bed having a pair of mounting reference surfaces; and
a mounting table slidably supported on said bed through a pair of bearings,
wherein each of said bearings includes:
a slide block secured at its upper surface to said mounting table and constituted by a block body of U-shaped cross-section having on the inner surfaces of both arms thereof a pair of right and left obliquely upward and downward directed raceways extending longitudinally thereof, said block body further having non-load carrying ball bores longitudinally extending through solid portions of said arms;
a track shaft secured to one of the mounting reference surfaces of said bed and fitted in a recess of said slide block so as to be slidable longitudinally thereof, said track shaft being formed on both its side portions facing the inner surfaces of both the arms with obliquely upward and downward directed raceways facing the raceways on said arms, respectively, to form load carrying ball grooves in cooperation with these raceways;

a pair of side covers attached to both side surfaces of said slide block and having respective guide grooves for providing commuhication between said load carrying ball grooves and the associated non-load carrying ball bores, respectively; and a multiplicity of balls accommodated in two rows of endless tracks formed by said load carrying ball grooves, non-load carrying ball bores and guide grooves, said balls being adapted to recirculate through the insides of said endless tracks.

8. A linear slide table unit according to claim 7, further comprising a preloading means for regulating the mounting height of said slide block with respect to said bed and applying a preload to each of said bearings.

9. A linear slide table unit according to claim 8, wherein said preloading means includes: a plurality of connecting members disposed on both the arms of the slide block of each of said bearings, respectively, for connecting and fastening said mounting table to said slide blocks; and a height-regulating member interposed between at least one of said arms of each of said slide blocks and said mounting table.

10. A linear slide table unit according to claim 9, wherein the thicness of said height-regulating member is made larger on the side of the arm of each of said slide blocks which has the raceway directed obliquely downward than on the opposite side.

11. A linear slide table unit according to claim 8, wherein each of said slide blocks has fitting grooves formed in the inner sides of both its arms, respectively, and bearing races of substantially L-shaped cross-section fitted in said fitting grooves, respectively, each of said bearing races having a raceway formed in the corner portion thereof.

12. A linear slide table unit according to claim 11, wherein at least one of the arms of each of said slide blocks is provided with a preload-regulating bolt penetrating therethrough, said preload-regulating bolt being adapted to press at its end the rear surface of said bearing race.

13. A linear slide table unit according to claim 12, wherein the end of said preload-regulating bolt abuts on the rear surface of the associated bearing race at a position lower than the horizontal line passing through the center of each of load carrying balls rolling along the raceway of said bearing race.

14. A linear slide table unit according of claim 7, wherein each of said bearings further includes a pair of ball retainers mounted between said side covers along the corresponding raceways formed on the slide block thereof for retaining the balls rolling along said raceways, respectively.

15. A linear slide table unit according to claim 7, wherein the contact angle of the balls, rolling along between the raceways formed on both the arms of each of said slide blocks and the raceways formed on said track shaft, with respect to these raceways is set to be about 45 degrees.

* * * * *